(12) United States Patent
Gambino

(10) Patent No.: US 10,929,199 B2
(45) Date of Patent: Feb. 23, 2021

(54) MEMORY LOCK SERIALIZATION

(71) Applicant: International Business Machines Corporation, Armonk, NY (US)

(72) Inventor: Mark R. Gambino, Brewster, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 91 days.

(21) Appl. No.: 16/024,978

(22) Filed: Jul. 2, 2018

(65) Prior Publication Data

US 2020/0004603 A1    Jan. 2, 2020

(51) Int. Cl.
| | |
|---|---|
| *G06F 9/46* | (2006.01) |
| *G06F 9/52* | (2006.01) |
| *G06F 11/30* | (2006.01) |
| *G06F 9/54* | (2006.01) |

(52) U.S. Cl.
CPC .............. *G06F 9/526* (2013.01); *G06F 9/544* (2013.01); *G06F 11/3037* (2013.01)

(58) Field of Classification Search
None
See application file for complete search history.

(56) References Cited

U.S. PATENT DOCUMENTS

| | | | | |
|---|---|---|---|---|
| 7,523,260 B2* | 4/2009 | Arimilli | ................... | G06F 9/526 711/124 |
| 7,979,617 B2 | 7/2011 | McKenney et al. | | |
| 8,453,122 B2 | 5/2013 | Flemming et al. | | |
| 8,799,914 B1* | 8/2014 | Metcalf | ................. | G06F 9/3004 718/104 |
| 9,201,802 B1 | 12/2015 | Armangau et al. | | |
| 2006/0212573 A1 | 9/2006 | Loaiza et al. | | |
| 2007/0067592 A1 | 3/2007 | Jeter, Jr. | | |
| 2010/0205608 A1* | 8/2010 | Nemirovsky | ......... | G06F 9/3851 718/104 |
| 2012/0036329 A1 | 2/2012 | Coon et al. | | |
| 2013/0290583 A1* | 10/2013 | Dice | ....................... | G06F 9/526 710/200 |

(Continued)

OTHER PUBLICATIONS

A. Morrison, "Scaling synchronization in multicore programs," (Jul.-Aug. 2016) Communications of the ACM, 59(11), pp. 44-51.

(Continued)

*Primary Examiner* — Kenneth Tang
(74) *Attorney, Agent, or Firm* — Cantor Colburn LLP; Teddi Maranzano

(57) ABSTRACT

A system includes a memory system with a shared memory resource and a processor with multiple processor cores operably coupled to the memory system. A lock requesting core is configured to access a shared location of the shared memory resource to determine whether a lockable portion of the shared memory resource is in a locked state. The lock requesting core adds a memory lock request to a lock waiting list associated with the lockable portion based on the shared location indicating the locked state. A lock granted location dedicated to the lock requesting core is monitored for an indication that the lock requesting core has been granted the locked state from a previous locking core of the processor cores. The lock requesting core performs one or more updates to the lockable portion based on determining that the lock requesting core has been granted the locked state.

13 Claims, 12 Drawing Sheets

(56) References Cited

U.S. PATENT DOCUMENTS

| | | | |
|---|---|---|---|
| 2015/0248367 A1* | 9/2015 | Tucek | G06F 12/0831 710/308 |
| 2016/0041852 A1* | 2/2016 | Suarez Gracia | G06F 1/3296 713/323 |
| 2016/0162017 A1* | 6/2016 | Henry | G06F 1/04 713/324 |

OTHER PUBLICATIONS

J. Shun, et al., "Reducing Contention Through Priority Updates," (Jul. 2013), In Proceedings of the twenty-fifth annual ACM symposium on Parallelism in algorithms and architectures, pp. 152-163.

K. Eric Harper, et al., "Performance Impact of Lock-Free Algorithms on Multicore Communication APIs," (2014) arXiv preprint arXiv: 1401.6100, 16 pages.

T. Gangwani, et al., "CASPAR: Breaking Serialization in Lock-Free Multicore Synchronization," (Mar. 2016), In ACM SIGPLAN Notices, vol. 51, No. 4, pp. 789-804.

* cited by examiner

MEMORY LOCK SERIALIZATION

BACKGROUND

The present invention relates to computer systems, and more particularly, to memory lock serialization in a multi-processing computer system.

In a multi-processing computer system, multiple processor cores (CPUs) may use a shared memory region to read and write data used by more than one of the CPUs. Serialization attempts to coordinate updates to the shared memory region such that no other CPUs can make updates to the shared memory region while one of the CPUs is making updates. Serialization approaches can become inefficient where multiple CPUs repeatedly attempt to obtain exclusive access to the shared memory region due to lock contention or high overhead from repeated suspension and re-dispatching of tasks attempting to obtain exclusive access to the shared memory region.

SUMMARY

According to a non-limiting embodiment, a system includes a memory system with a shared memory resource and a processor with multiple processor cores operably coupled to the memory system. A lock requesting core is configured to access a shared location of the shared memory resource to determine whether a lockable portion of the shared memory resource is in a locked state. The lock requesting core adds a memory lock request to a lock waiting list associated with the lockable portion based on the shared location indicating the locked state. A lock granted location dedicated to the lock requesting core is monitored for an indication that the lock requesting core has been granted the locked state from a previous locking core of the processor cores. The lock requesting core performs one or more updates to the lockable portion based on determining that the lock requesting core has been granted the locked state.

According to a non-limiting embodiment, a method of memory lock serialization includes accessing a shared location of a shared memory resource to determine, by a lock requesting core of a plurality of processor cores of a processor, whether a lockable portion of the shared memory resource is in a locked state. A memory lock request is added, by the lock requesting core, to a lock waiting list associated with the lockable portion of the shared memory resource based on the shared location indicating the locked state. A lock granted location dedicated to the lock requesting core is monitored for an indication that the lock requesting core has been granted the locked state from a previous locking core of the processor cores. One or more updates to the lockable portion of the shared memory resource are performed by the lock requesting core based on determining that the lock requesting core has been granted the locked state.

According to a non-limiting embodiment, a computer program product includes a computer readable storage medium having program instructions embodied therewith. The program instructions are executable by a processing system to perform a plurality of operations including accessing a shared location of a shared memory resource to determine, by a lock requesting core of a plurality of processor cores of a processor, whether a lockable portion of the shared memory resource is in a locked state. The operations also include adding a memory lock request, by the lock requesting core, to a lock waiting list associated with the lockable portion of the shared memory resource based on the shared location indicating the locked state. The operations further include monitoring a lock granted location dedicated to the lock requesting core for an indication that the lock requesting core has been granted the locked state from a previous locking core of the processor cores, and performing one or more updates to the lockable portion of the shared memory resource by the lock requesting core based on determining that the lock requesting core has been granted the locked state.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
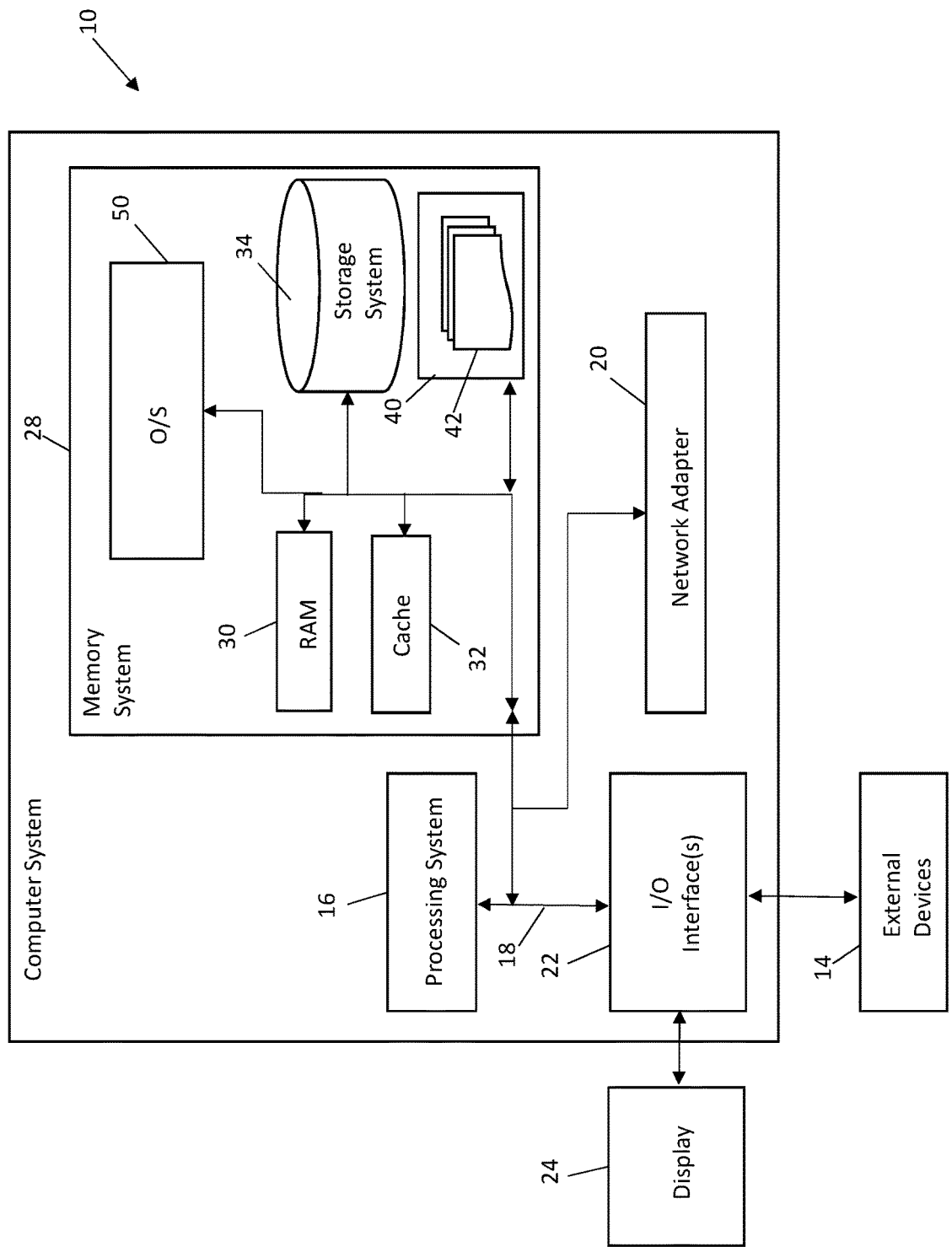
FIG. 1 is a block diagram illustrating a computer system in accordance with various embodiments of the invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" can include any integer number greater than or equal to one, i.e. one, two, three, four, etc. The terms "a plurality" can include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, in a multi-processing computer system, multiple processor cores (CPUs) that use the same memory resource, such as a memory table, may serialize multiple updates to the memory table in a consistent manner, meaning no other CPUs can make updates to the table while a CPU is making updates, plus all or none of the updates made by the CPU are visible to other CPUs. In between getting the lock and releasing it, if another CPU attempts to lock the table, the other CPU is informed that the lock is already held and typically the other CPU sits in a spin loop attempting to lock the table until the lock is available/granted. This is referred to as lock contention. A given memory cache may be dedicated to one CPU or shared by a subset of CPUs. A given set of memory (referred to as a memory cache line for this description) can be in multiple memory caches at a time, in which case one copy is the master copy and the CPU(s) owning the cache can update it while all other copies of the cache line in cache are read-only copies. If the master copy is updated, all read-only copies are invalidated (removed from the other memory caches). If a CPU that has a read-only copy of the cache line (or no copy of the cache line) wants to update the cache line, the owner of the writable copy must be transferred to this CPU. In general, multi-core processors with multiple caches perform better when a given set of frequently updated memory is only updated by one CPU or restricted to a subset of CPUs that share a memory cache. However, for system-wide resources, it may not be feasible to restrict access to a given memory table to only a subset of CPUs.

When there is significant lock contention on computer architectures with multiple memory caches, there can be strain on the memory subsystem moving a given cache line across multiple CPUs that are all spinning while attempting to lock the table. This can have negative performance impacts on the entire computer system, including the CPU that is actually holding the lock. To enable a given CPU to execute instructions faster, a combination of out-of-order (OOO) execution and branch prediction techniques may be implemented in hardware implementations. While these techniques can work well in many cases, they may eliminate the gains achieved by a read-only check added to the memory table lock mechanism. Specifically, the hardware can perform speculative execution and predict that a code sequence will exit a read-only loop and attempt to update a cache line; therefore, the hardware can obtain write access for the cache line ahead of time. The speculative actions can result in performance issues, for instance, because the owner of the writable copy of the cache line is transferred between different CPUs spinning to get the lock. With large systems having dozens of CPUs, memory lock contention can be a substantial limiting factor for system growth.

Turning now to an overview of the aspects of the invention, one or more embodiments of the invention address the above-described shortcomings of the prior art by providing a shared location (e.g., in a shared cache line) that is used to keep track of which CPU, if any, is currently holding a lock along with a lock waiting list indicating which CPUs, if any, are waiting for the lock. The lock waiting list can be maintained in the order in which CPUs requested the lock. If the lock is held and another CPU wants to get the lock, a lock requesting CPU can add itself to the list of CPUs waiting for the lock and then the lock requesting CPU can spin waiting for a field in memory to be updated to indicate the lock has been granted to the lock requesting CPU. In embodiments, there is a different lock granted location dedicated for each CPU, each of which can reside in a separate cache line. For example in a four CPU system, if CPU 2 and CPU 3 are both waiting for the lock, then CPU 2 can spin in a loop looking at memory in a cache line that only CPU 2 is reading and CPU 3 spins in a loop looking at memory in a cache line that only CPU 3 is reading. The result is prevention of hot cache lines and better system performance, especially as the number of processor cores in the system increases.

The above-described aspects of the invention address the shortcomings of the prior art by reducing lock contention by partitioning lock management between a combination of shared and dedicate lock management resources. For example, when a CPU that was holding a lock is done and proceeds to unlock the table, the CPU can check a shared cache line to see if any other CPUs are waiting for the lock.

If no CPUs are waiting, then the lock is marked as available. If one or more CPUs are waiting, then the lock is given to the first CPU in the lock waiting list and the first waiting CPU is notified that the lock has been granted (e.g., by updating a copy of the lock granted location for the waiting CPU). This allows for the lock to be granted to CPUs in the order in which the lock requests were made. To make "dirty" read cases (e.g., an uncommitted dependency where a single read is done against the shared memory to see if the lock is held rather than a spin loop waiting to obtain the lock) as efficient as possible, a "lock is held" field can be used (e.g., with a value of YES or NO). The "lock is held" field can reside in its own memory cache line. A dirty read may be performed by checking a field that indicates which CPU is holding the lock. However, it is possible for the table to remain locked for a period of time as the lock is transferred between CPUs. A field indicating which CPU is holding the lock may be updated multiple times as the lock is transferred (which may cause cache line invalidates). In this example, the "lock is held" field would remain YES for the entire time such that any CPU doing a dirty read could continue to use its read-only copy of the cache line. Technical effects and benefits can include improving performance for memory locks with high contention, and ensuring a table lock is given to CPUs in the order in which the CPUs requested the lock on the table.

With reference now to FIG. 1, a computer system 10 is illustrated in accordance with a non-limiting embodiment of the present disclosure. The computer system 10 may be based on the z/Architecture, for example, offered by International Business Machines Corporation (IBM). The architecture, however, is only one example of the computer system 10 and is not intended to suggest any limitation as to the scope of use or functionality of embodiments described herein. Regardless, computer system 10 is capable of being implemented and/or performing any of the functionality set forth hereinabove.

Computer system 10 is operational with numerous other computing system environments or configurations. Examples of well-known computing systems, environments, and/or configurations that may be suitable for use with computer system 10 include, but are not limited to, personal computer systems, server computer systems, thin clients, thick clients, cellular telephones, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Further, elements of the computer system 10 can be incorporated in one or more network devices to support computer network functionality, such as a network switch, a network router, or other such network support devices.

Computer system 10 may be described in the general context of computer system-executable instructions, such as program modules, being executed by the computer system 10. Generally, program modules may include routines, programs, objects, components, logic, data structures, and so on that perform particular tasks or implement particular abstract data types. Computer system 10 may be practiced in distributed cloud computing environments where tasks are performed by remote processing devices that are linked through a communications network. In a distributed computing environment, program modules may be located in both local and remote computer system storage media including memory storage devices.

As shown in FIG. 1, computer system 10 is shown in the form of a computing device, also referred to as a processing device. The components of computer system may include, but are not limited to, a processing system 16 including one or more processors or processing units, a memory system 28, and a bus 18 that operably couples various system components including memory system 28 to processing system 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 10 may include a variety of computer system readable media. Such media may be any available media that are accessible by computer system/server 10, and they include both volatile and non-volatile media, removable and non-removable media.

Memory system 28 can include an operating system (OS) 50, along with computer system readable media in the form of volatile memory, such as random access memory (RAM) 30 and/or cache memory 32. Computer system 10 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory system 28 may include at least one program product having a set (e.g., at least one) of program modules that are configured to carry out the functions of embodiments of the disclosure.

The OS 50 controls the execution of other computer programs and provides scheduling, input-output control, file and data management, memory management, and communication control and related services. The OS 50 can also include communication protocol support as one or more drivers to implement various protocol layers in a protocol stack (e.g., transmission control protocol/internet protocol (TCP/IP)) to support communication with other computer systems across one or more computer networks.

The storage system 34 can store a basic input output system (BIOS). The BIOS is a set of essential routines that initialize and test hardware at startup, start execution of the OS 50, and support the transfer of data among the hardware devices. When the computer system 10 is in operation, the processing system 16 is configured to execute instructions stored within the storage system 34, to communicate data to and from the memory system 28, and to generally control operations of the computer system 10 pursuant to the instructions.

Program/utility 40, having a set (at least one) of program modules 42, may be stored in memory system 28 by way of example, and not limitation, as well as the OS 50, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein at an application layer level in a communication protocol stack.

Computer system 10 may also communicate with one or more external devices 14 such as a keyboard, a pointing device, a display 24, etc.; one or more devices that enable a user to interact with computer system/server 10; and/or any devices (e.g., network card, modem, etc.) that enable computer system/server 10 to communicate with one or more other computing devices. Such communication can occur via Input/Output (I/O) interfaces 22. Still yet, computer system 10 can communicate with one or more networks such as a local area network (LAN), a general wide area network (WAN), and/or a public network (e.g., the Internet) via network adapter 20. As depicted, network adapter 20 communicates with the other components of computer system 10 via bus 18. It should be understood that although not shown, other hardware and/or software components could be used in conjunction with computer system 10. Examples include, but are not limited to: microcode, device drivers, redundant processing units, external disk drive arrays, RAID systems, tape drives, data archival storage systems, etc.

Figure 2:
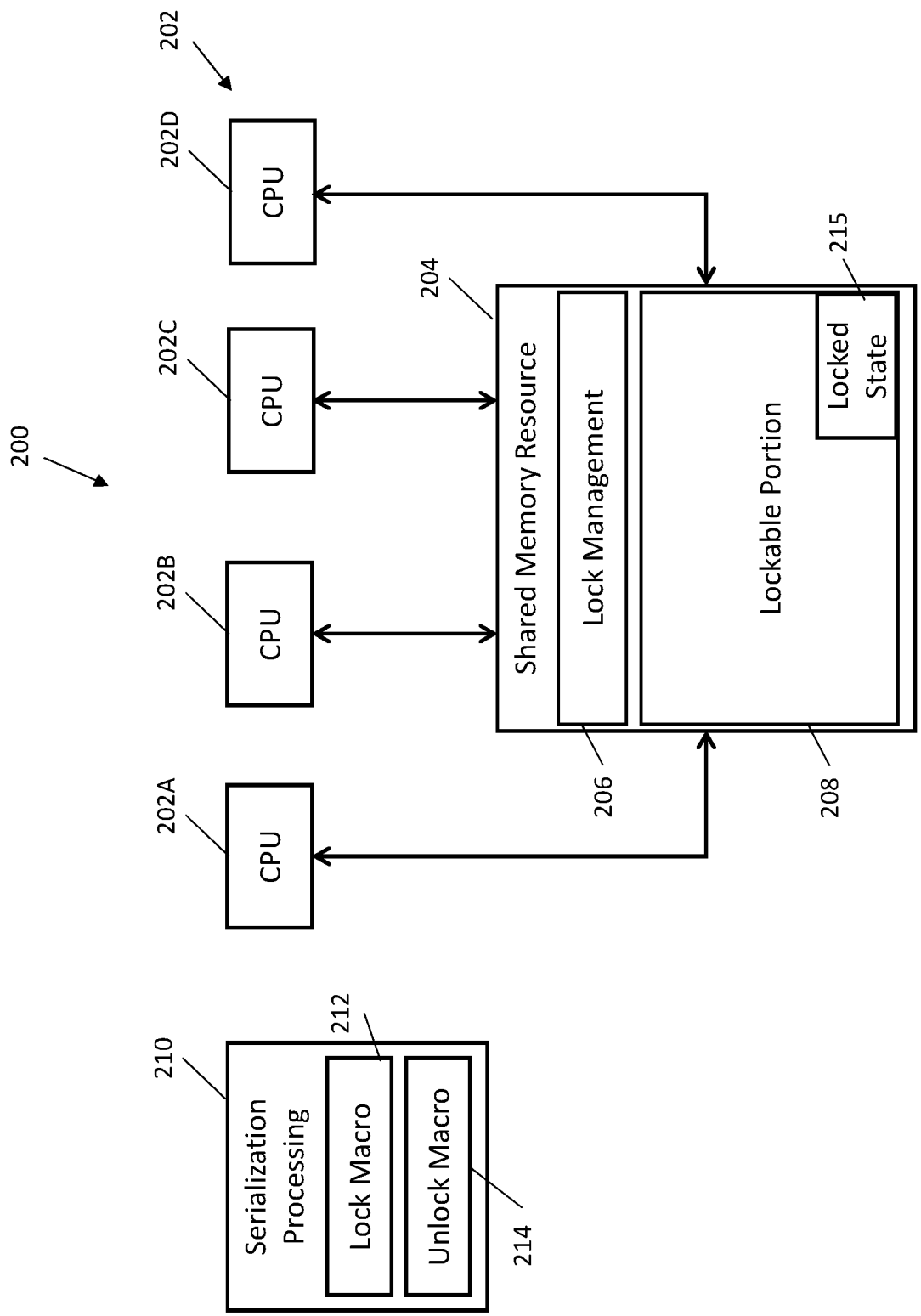
FIG. 2 is a block diagram of a multi-processing computer system with memory lock serialization support according to a non-limiting embodiment.

Turning now to a more detailed description of aspects of the present invention, FIG. 2 depicts a block diagram of a multi-processing computer system 200. The multi-processing computer system 200 can include a plurality of processor cores 202 of the processing system 16 of FIG. 1. In the example of FIG. 2, there are four processor cores (CPUs) 202A, 202B, 202C, 202D depicted; however, any number of two or more processor cores 202 can be included in embodiments. The processor cores 202 can access various portions of the memory system 28 of FIG. 1, including at least one shared memory resource 204, which may be a memory table accessible by each of the processor cores 202. The shared memory resource 204 can be partitioned into lock management 206 and a lockable portion 208 of storage, where serialization processing 210 uses the lock management 206 to lock or unlock the lockable portion 208 to assign exclusive write access to one of the processor cores 202. The serialization processing 210 can be a component of the OS 50 of FIG. 1 and can include a lock macro 212 and an unlock macro 214. Each of the processor cores 202 can execute an instance of the OS 50 of FIG. 1 with serialization processing 210 to request or remove a locked state 215 of the lockable storage. An example lock/unlock sequence is further described in reference to FIGS. 3-11.

Figure 3:
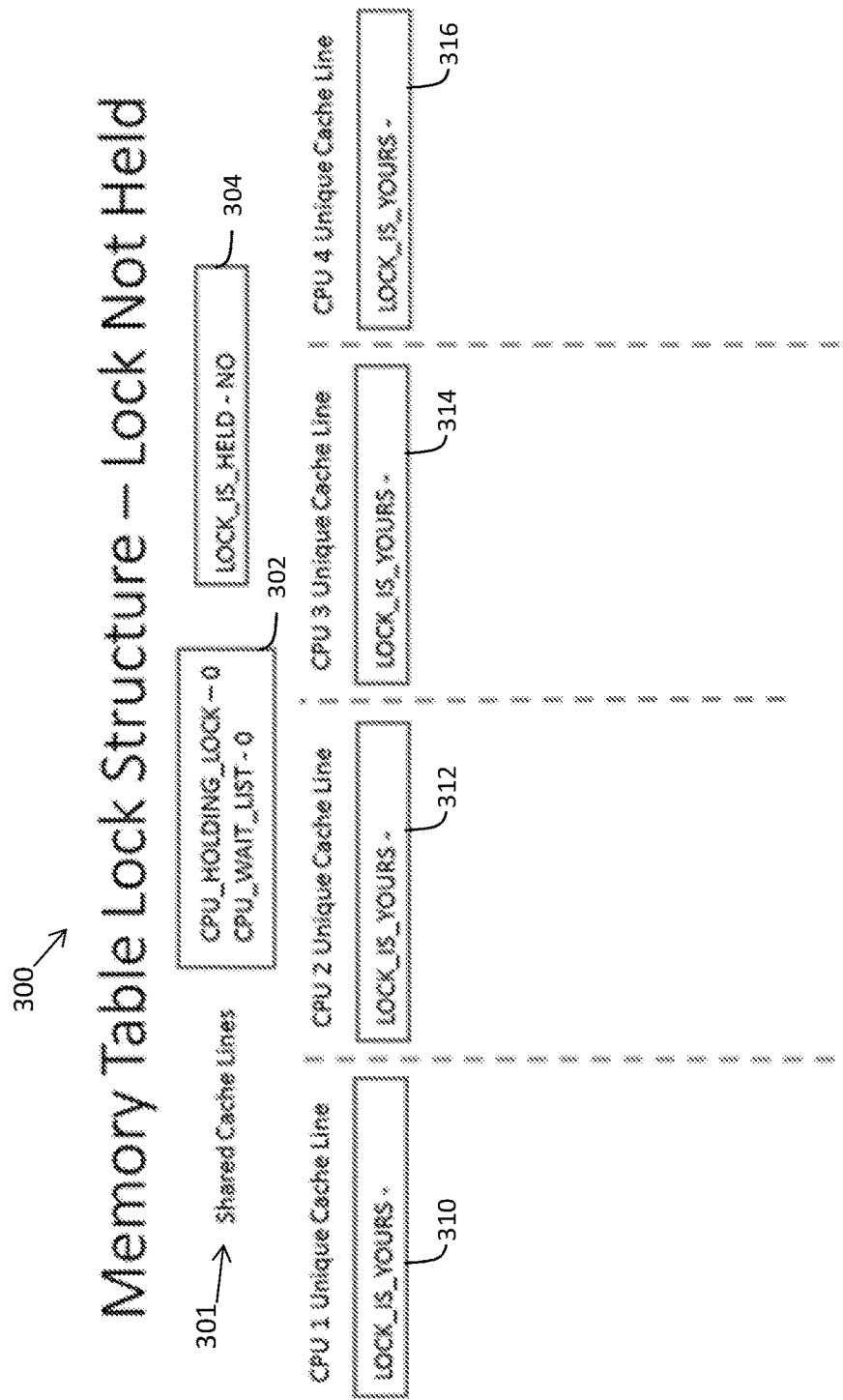
FIG. 3 is a block diagram illustrating a memory table lock structure according to a non-limiting embodiment.

As depicted in FIG. 3, a memory table lock structure state 300 can include a plurality of cache lines as part of the lock management 206 of FIG. 2 to control a locked state 215 of the lockable portion 208 of the shared memory resource 204 of FIG. 2, such as a shared memory table. A shared location 301 of the memory table lock structure state 300 can include a first cache line 302 with shared read and write access between the processor cores 202 of FIG. 2. The first cache line 302 can include a lock word (LOCKWORD), an indicator of the processor core 202 holding the locked state 215 (CPU HOLDING LOCK), and a lock waiting list (CPU_WAIT_LIST). The memory table lock structure state 300 can also include a second cache line 304 used by one or more reading cores of the processor cores 202 to indicate whether the lockable portion 208 of the shared memory resource 204 is in the locked state 215 (LOCK IS HELD). Embodiments also include a CPU unique cache line 310, 312, 314, 316 for each of the processor cores 202A, 202B, 202C, 202D in the memory table lock structure state 300. Thus, the memory table lock structure state 300 can include N+2 cache lines of memory (which may be contiguous storage to make implementation easier), where N is the number of processor cores 202 that share access to the shared memory resource 204.

In embodiments, the LOCKWORD can be used to serialize updates for the first cache line 302 and the second cache line 304, for example, by calls to the lock macro 212 and the unlock macro 214. The CPU HOLDING LOCK can be used to indicate which processor core 202 currently has the lock (where a value of zero indicated not locked in this example). The CPU_WAIT_LIST can include a list of processor cores 202 waiting for the lock because another of the processor cores 202 already has the lock (where a value of zero indicates no CPU is waiting for the lock). The second cache 304 may be used by dirty readers to see if the lock is held (e.g., the lockable portion 208 is in the locked state 215). The LOCK_IS_HELD can indicate whether the lock is held (YES or NO). For cache lines 310-316, there can be one cache line 310-316 for each processor core 202 that is only used by the same processor core 202 while waiting to get the lock held by another processor core 202. The cache lines 310-316 can each include a LOCK IS YOURS indicator that the lock has been transferred to this processor core 202A-202D (e.g., YES or NO).

In embodiments, the OS 50 of FIG. 1 provides the lock macro 212 of FIG. 2 and the unlock macro 214 for system code and/or user code use for any shared memory tables. Input to either the lock macro 212 or the unlock macro 214 can be a name of a memory table or other shared memory resource 204. A high-level sequence of events in the example of FIGS. 3-11 is as follows: 1) CPU 2 (processor core 202B) locks the lockable portion 208 of the shared memory resource 204, 2) CPU 3 (processor core 202C) attempts to lock the lockable portion 208 and has to wait, 3) CPU 4 (processor core 202D) attempts to lock the lockable portion 208 and has to wait, 4) CPU 1 (processor core 202A) does a dirty read to see if the lock is available, 5) CPU 2 finishes processing and passes the lock to CPU 3, 6) CPU 1 does another dirty read to see if the lock is available, 7) CPU 3 finishes processing and passes the lock to CPU 4, 8) CPU 4 finishes processing and marks the lock as available (no more CPUs waiting for the lock), 9) CPU 1 does another dirty read to see if the lock is available. The lock is available, so CPU 1 locks the table, and 10) CPU 1 finishes processing and marks the lock as available (no CPU waiting for the lock).

Figure 4:
FIG. 4 is a block diagram illustrating a memory table lock structure according to a non-limiting embodiment.
Figure 5:
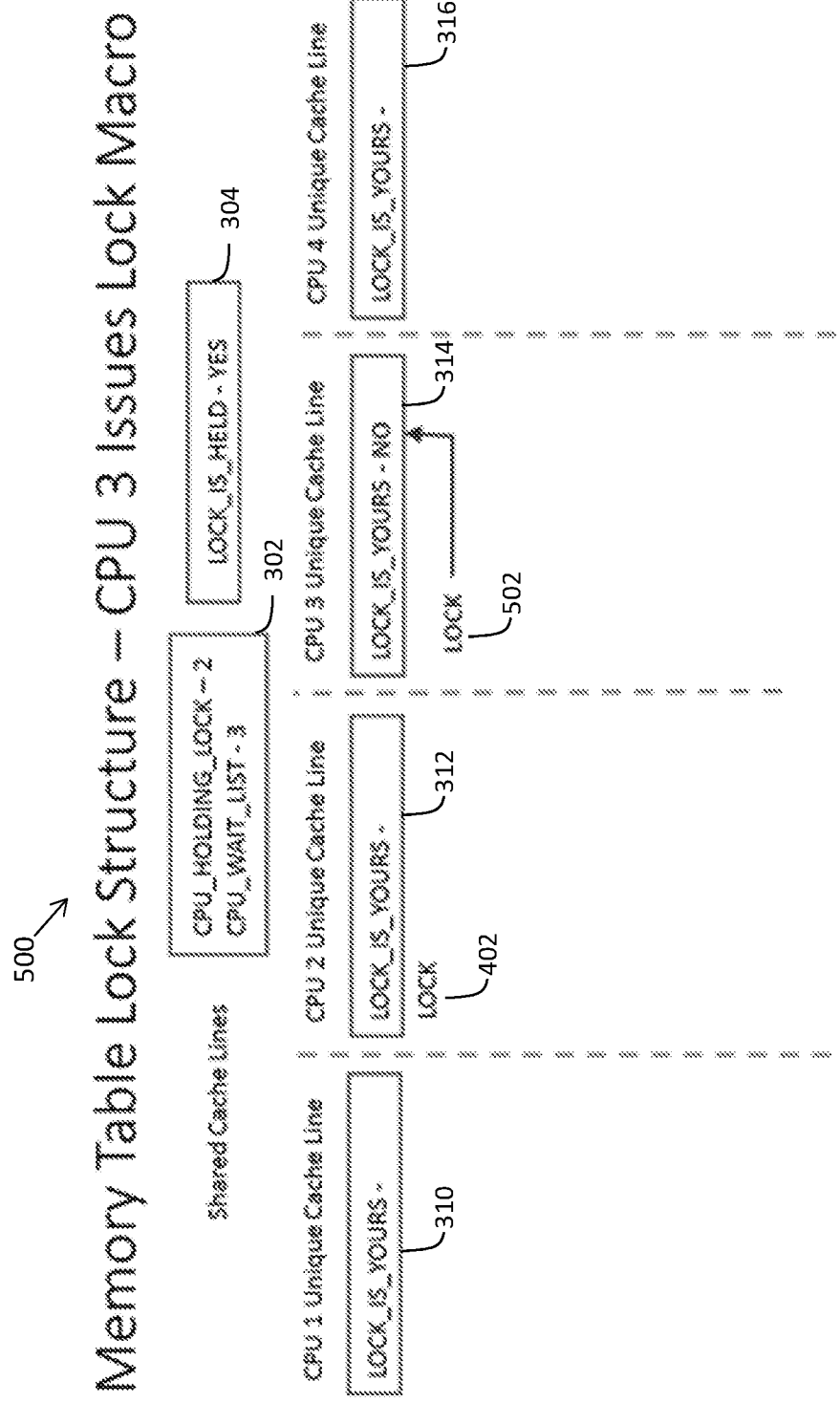
FIG. 5 is a block diagram illustrating a memory table lock structure according to a non-limiting embodiment.

FIG. 3 shows the initial state of memory table lock cache line contents when the lock is not held in memory table lock structure state 300. In FIG. 4, CPU 2 issues the lock macro 212 and is able to get the lock as indicated by lock request 402 in memory table lock structure state 400 and CPU HOLDING LOCK with a value of 2 in the first cache line 302. The LOCK_IS_HELD transitions from NO to YES in the second cache line 304. In FIG. 5, CPU 3 issues the lock macro 212 attempting to get the lock as indicated by lock request 502 in memory table lock structure state 500. The lock is still held by CPU 2, so CPU 3 adds itself to the lock waiting list (CPU_WAIT_LIST with a value of 3 in the first cache line 302) and initializes cache line 314 (its own cache line) to indicate that CPU 3 does not have the lock yet (LOCK_IS_YOURS=NO). CPU 3 can spin on its own cache line 314 waiting for the lock.

Figure 6:
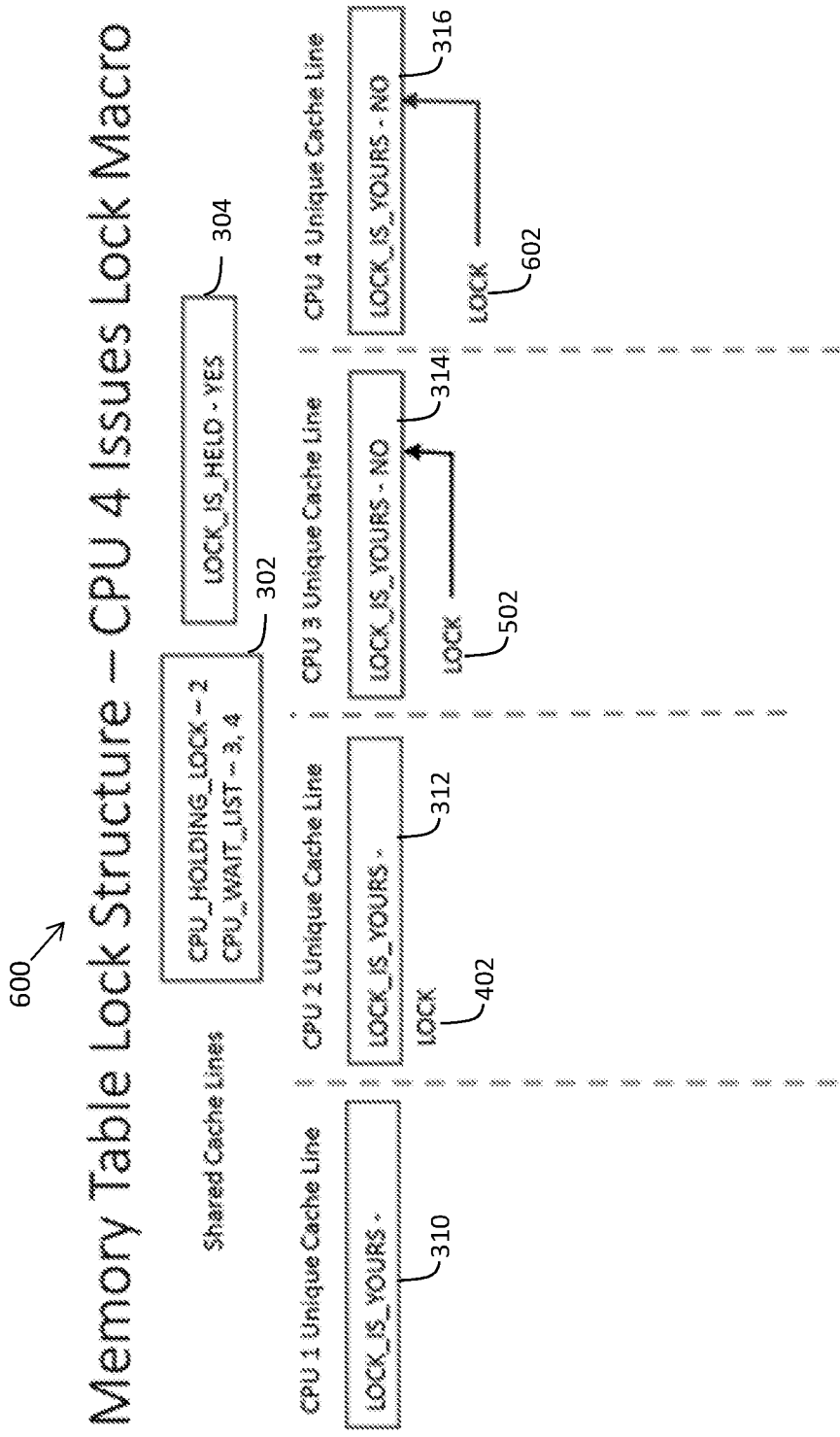
FIG. 6 is a block diagram illustrating a memory table lock structure according to a non-limiting embodiment.

In FIG. 6, CPU 4 issues the lock macro 212 attempting to get the lock as indicated by lock request 602 in memory table lock structure state 600. The lock is still held by CPU 2, so CPU 4 adds itself to end of the lock waiting list (CPU_WAIT_LIST with a value of 3, 4 in the first cache line 302), and initializes cache line 316 (its own cache line) to indicate that CPU 4 does not have the lock yet (LOCK_IS_YOURS=NO). CPU 4 can spin on cache line 316 (its own cache line) waiting for the lock.

Figure 7:
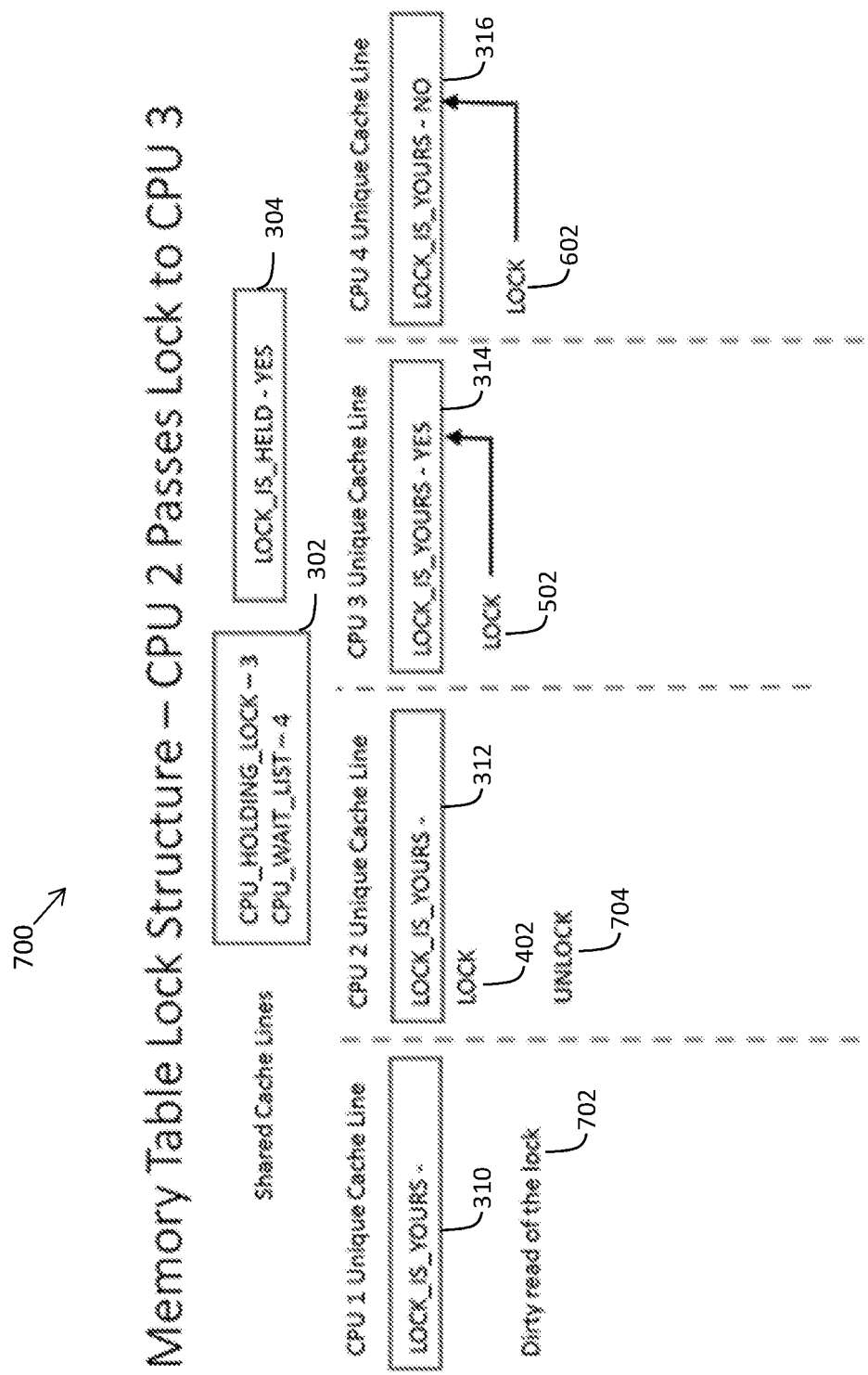
FIG. 7 is a block diagram illustrating a memory table lock structure according to a non-limiting embodiment.

In FIG. 7, CPU 1 does a dirty read 702 to see if the lock is held, for example, by checking the LOCK_IS_HELD field in the second cache line 304 in memory table lock structure state 700. A value of YES in the LOCK_IS_HELD field indicates that the lock is held, and thus CPU 1 can continue doing other work without spinning or busy waiting. When CPU 2 finishes the work it needed to do under lock, CPU 2 can issue the unlock macro 214 as unlock request 704. CPU 2 can determine that other CPUs are waiting for the lock based on the lock waiting list (CPU_WAIT_LIST) and changes the owner of the lock to be a lock requesting core that is the first CPU (CPU_HOLDING_LOCK=3) in the lock waiting list (CPU_WAIT_LIST), removes CPU 3 from the lock waiting list (CPU_WAIT_LIST), and updates the LOCK_IS_YOURS field of cache line 314 of CPU 3 to notify CPU 3 that the lock has been granted.

Figure 8:
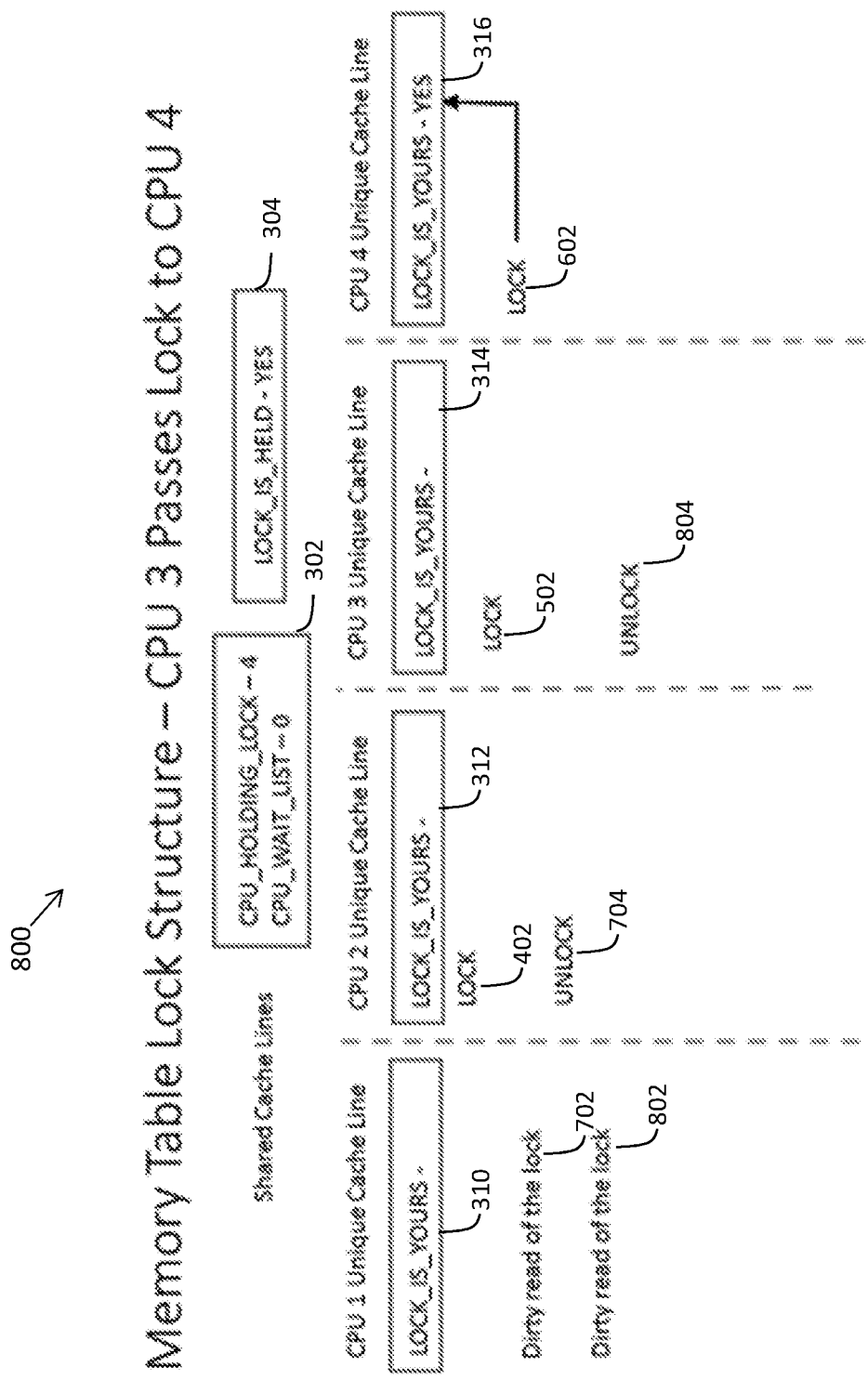
FIG. 8 is a block diagram illustrating a memory table lock structure according to a non-limiting embodiment.

In FIG. 8, CPU 1 performs another dirty read 802 to determine whether the lock is held, for example, by checking the LOCK_IS_HELD field in the second cache line 304 in memory table lock structure state 800. The value of YES indicates that the lock is held, and thus CPU 1 can continue doing other work without spinning or busy waiting. Further in FIG. 8, CPU 3 had observed that it owned the lock (LOCK_IS_YOURS field set to YES in cache line 314 in memory table lock structure state 700 of FIG. 7), performed work needed to be completed under lock, and then issues the unlock macro 214 as unlock request 804. CPU 3 can determine that other CPUs are waiting for the lock based on the lock waiting list (CPU_WAIT_LIST) and changes the owner of the lock to be a lock requesting core that is the CPU (CPU_HOLDING_LOCK=4) in the lock waiting list (CPU_WAIT_LIST). CPU 3 can also remove CPU 4 from the lock waiting list (CPU_WAIT_LIST), and updates the cache line 316 of CPU 4 to notify CPU 4 that the lock has been granted (LOCK_IS_YOURS=YES). The cache line 314 can be cleared such that the LOCK_IS_YOURS field is no longer set in cache line 314. CPU 4 observes that it owns the lock (LOCK_IS_YOURS field set to YES in cache line 316 in memory table lock structure state 800 of FIG. 8) and performs the work needed to be completed under lock.

Figure 9:
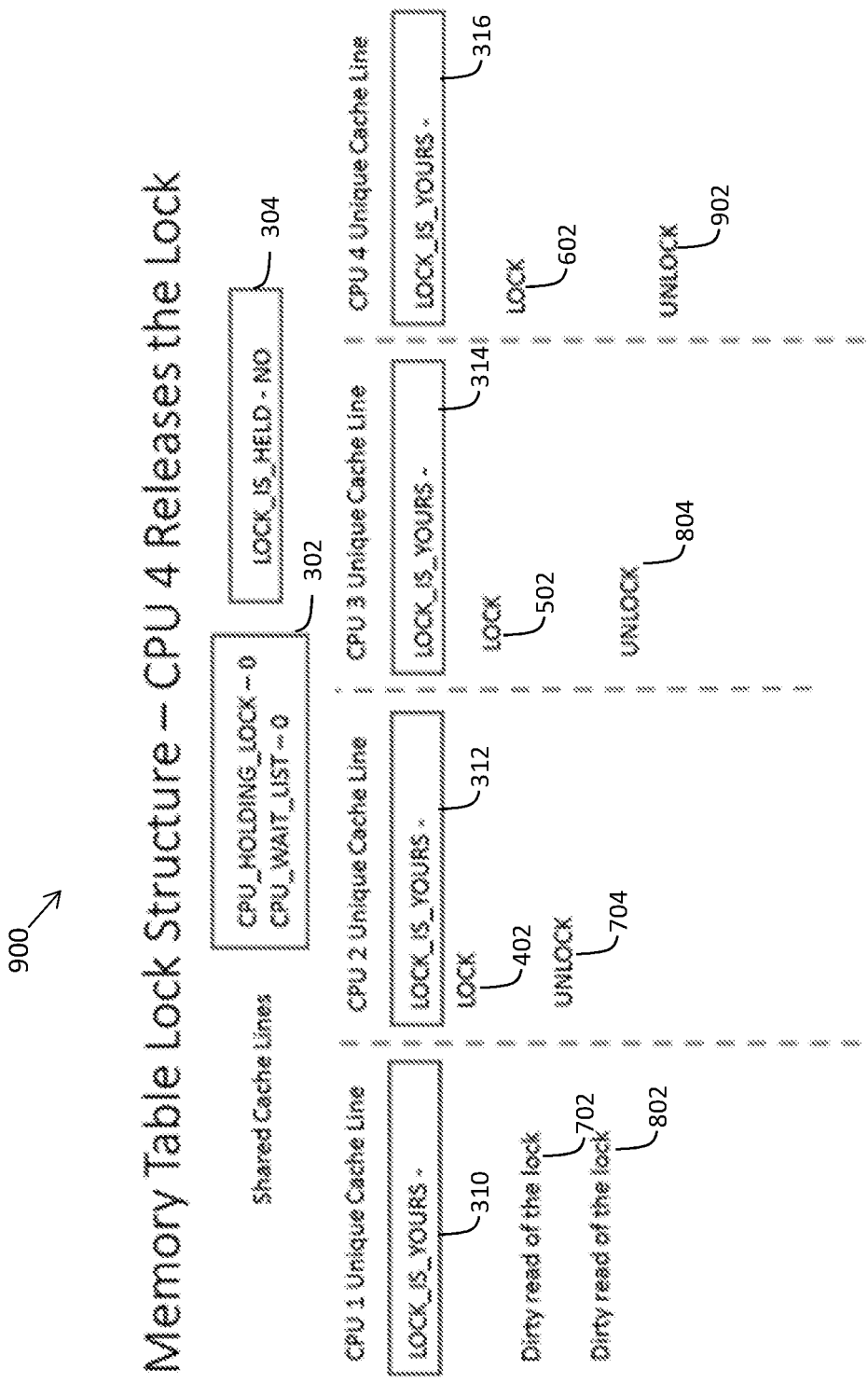
FIG. 9 is a block diagram illustrating a memory table lock structure according to a non-limiting embodiment.

In FIG. 9, CPU 4 issues the unlock macro 214 at unlock request 902 in memory table lock structure state 900. CPU 4 determines that no CPUs are waiting for the lock (CPU_WAIT_LIST=0); therefore, CPU 4 can mark the lock as available (CPU_HOLDING_LOCK=0, LOCK_IS_HELD=NO).

Figure 10:
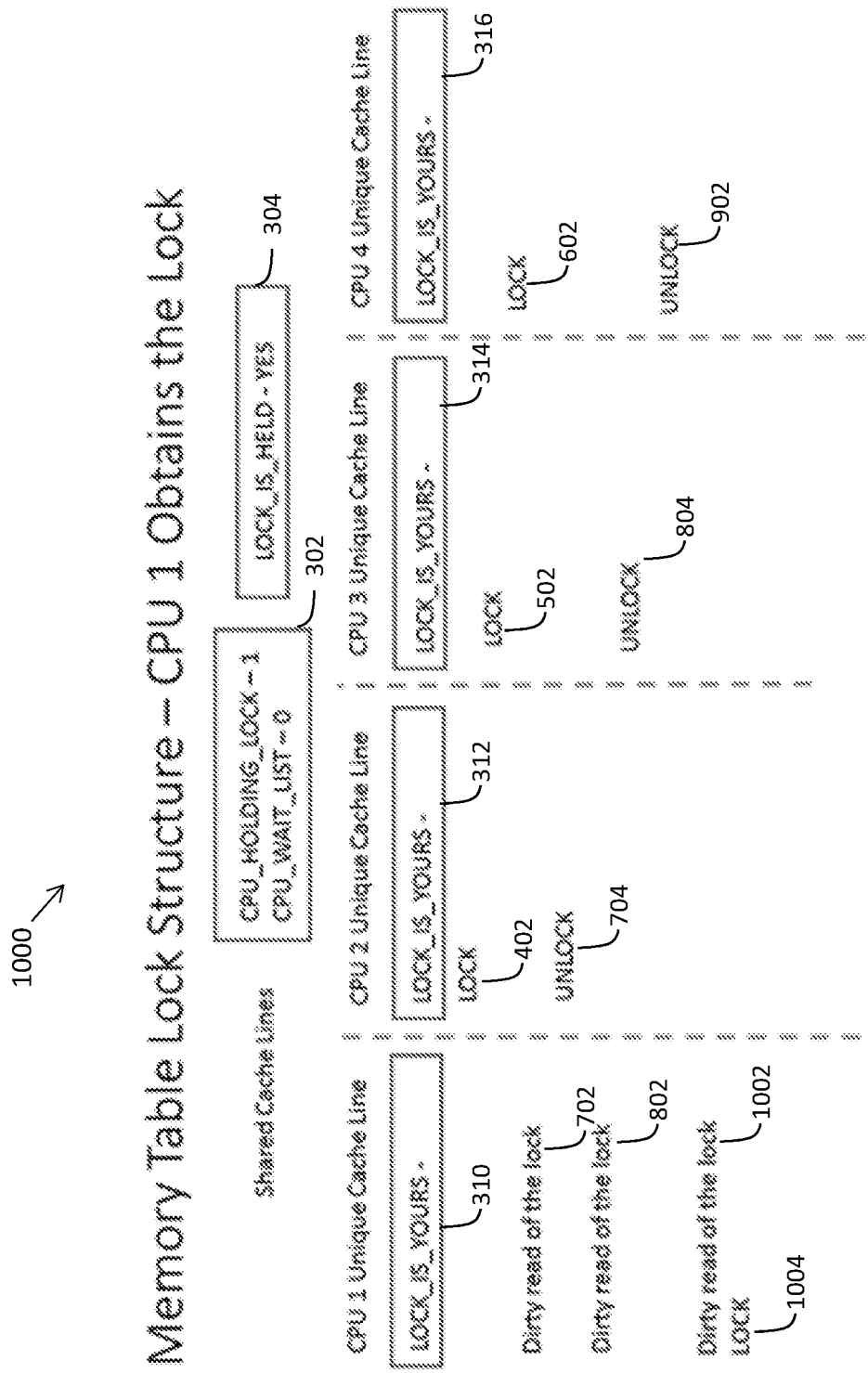
FIG. 10 is a block diagram illustrating a memory table lock structure according to a non-limiting embodiment.

In FIG. 10, CPU 1 does another dirty read 1002 in memory table lock structure state 1000 to determine whether the lock is held, for example, by checking the LOCK_IS_HELD field in the second cache line. The value of LOCK_IS_HELD field is initially set to a value of NO indicating that the lock is available, and CPU 1 issues the lock macro 212 as a lock request 1004 to obtain the lock. This results in CPU 1 obtaining the lock and setting the CPU_HOLDING_LOCK=1 and LOCK_IS_HELD=YES.

Figure 11:
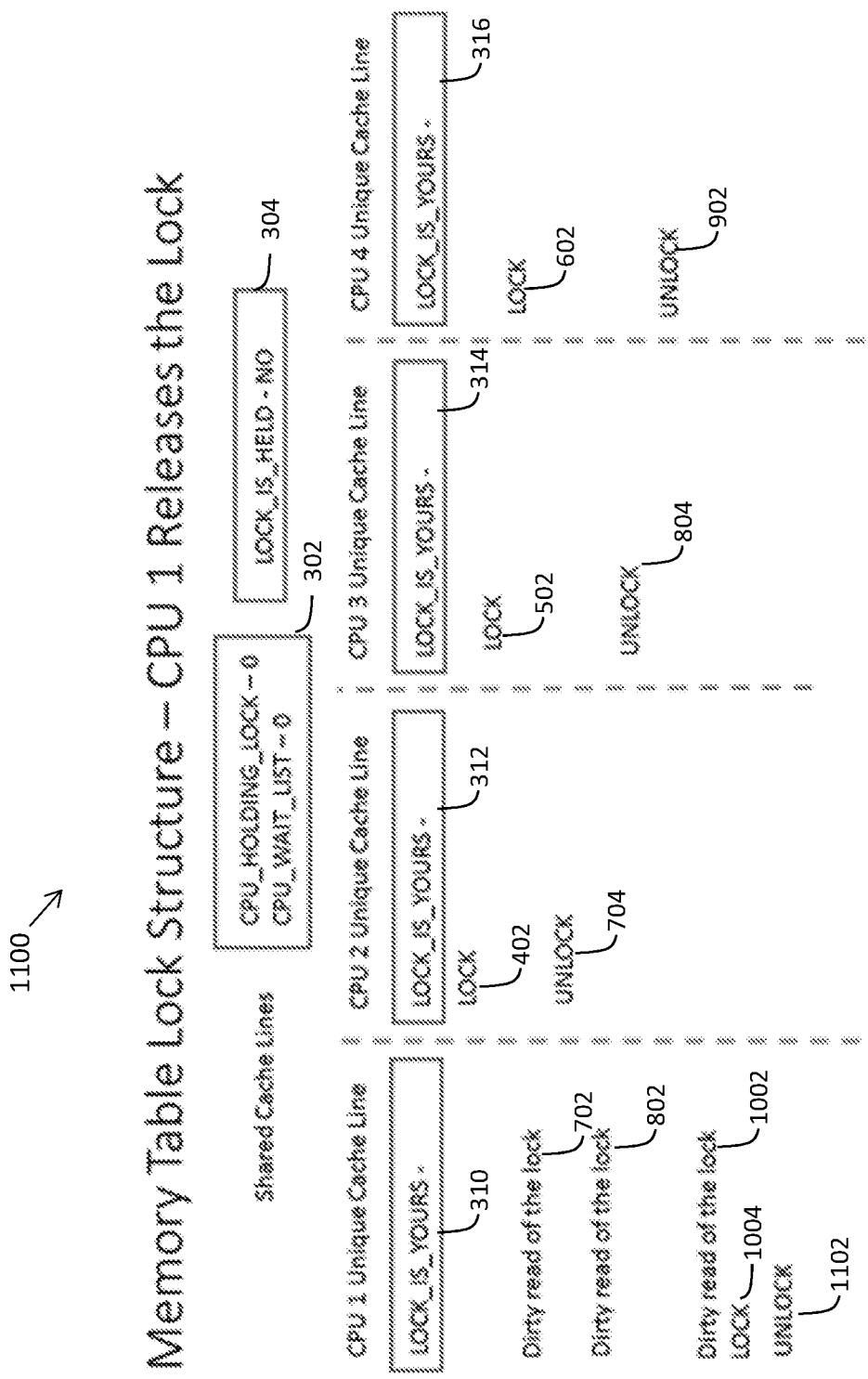
FIG. 11 is a block diagram illustrating a memory table lock structure according to a non-limiting embodiment.

In FIG. 11, CPU 1 finishes the work to be performed under lock and issues the unlock macro 214 as unlock request 1102 in memory table lock structure state 1100. CPU 1 can determine that no CPUs are waiting for the lock (CPU_WAIT_LIST=0); therefore, CPU 1 marks the lock as available (CPU_HOLDING_LOCK=0, LOCK_IS_HELD=NO).

Each call to the lock macro 212 or the unlock macro 214 can interact with either or both of the first cache line 302 and the second cache line 304 for a very short amount of time (e.g., only several instructions executed). Even when there is a high degree of lock contention, spinning on the shared first and second cache lines 302, 304 is avoided; therefore, system efficiency impacts of managing memory lock serialization are enhanced. In addition, the lock waiting list (CPU_WAIT_LIST) can prevent a frenzy of multiple CPUs attempting to get the lock when the CPU that was holding the lock issues the unlock macro 214. The lock waiting list (CPU_WAIT_LIST) can also ensure that when an unlock macro 214 completes, the lock is given to the CPU that has been waiting the longest for the lock. Alternatively, other lock assignment approaches can be used. For example, priorities can be assigned to tasks represented in the lock waiting list (CPU_WAIT_LIST), and lock granting may be performed by selecting the highest priority entry in the lock waiting list (CPU_WAIT_LIST). In some embodiments, lower priority tasks that have been waiting in the lock waiting list (CPU_WAIT_LIST) may be granted a priority increase as the lower priority tasks age within the lock waiting list (CPU_WAIT_LIST) to ensure that the lower priority tasks are serviced. Other weighting and CPU selection options from the lock waiting list (CPU_WAIT_LIST) are contemplated.

Figure 12:
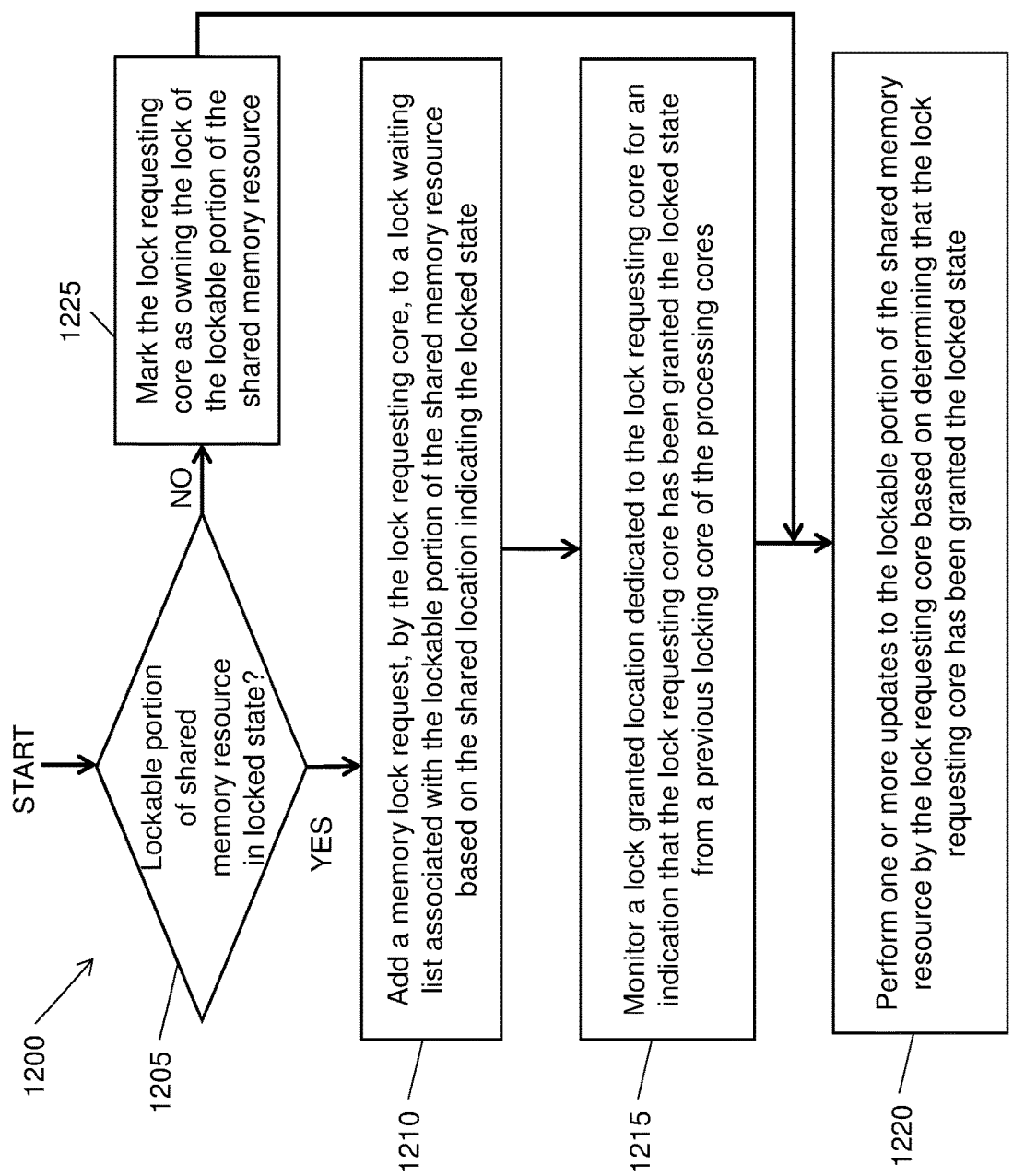
FIG. 12 is a flow diagram illustrating a method according to a non-limiting embodiment.

Turning now to FIG. 12, a flow diagram of a process 1200 for memory lock serialization is generally shown in accordance with an embodiment. The process 1200 is described with reference to FIGS. 1-12 and may include additional steps beyond those depicted in FIG. 12.

At block 1205, a lock requesting core of processor cores 202 accesses a shared location 301 of a shared memory resource 204 to determine whether a lockable portion 208 of the shared memory resource 204 is in a locked state 215. The lock requesting core can change over time. For example, in reference to FIG. 4, CPU 2 is a lock requesting core, and in FIG. 5, CPU 3 is a lock requesting core. The shared location 301 can include a first cache line 302 with shared read and write access between the processor cores 202. The first cache line 302 can include a lock word (LOCKWORD), an indicator of the processor core 202 holding the locked state 215 (CPU_HOLDING_LOCK), and a lock waiting list (CPU_WAIT_LIST). The shared location 301 may also include a second cache line 304 used by one or more reading cores of the processor cores 202 to indicate whether the lockable portion 208 of the shared memory resource 204 is in the locked state 215 (e.g., LOCK_IS_HELD). For example, in FIG. 7, CPU 1 is considered a reading core that performs a dirty read 702 of the LOCK_IS_HELD field in the second cache line 304. A separate cache line 310-316 dedicated to each of the processor cores 202 can be writeable by the processor cores 202 to indicate that an individual one of the processor cores 202 has been granted the locked state 215 (e.g., LOCK_IS_YOURS). If the lockable portion 208 of the shared memory resource 204 is in the locked state 215, then the process 1200 advances to block 1210; otherwise, the process 1200 advances to block 1225.

At block 1210, the lock requesting core adds a memory lock request to the lock waiting list (CPU_WAIT_LIST) associated with the lockable portion 208 of the shared memory resource 204 based on the shared location 301 indicating the locked state 215. The memory lock request can include adding an identifier associated with the lock requesting to a last position in the lock waiting list (CPU_WAIT_LIST) such that ordering is maintained.

At block 1215, a lock granted location (LOCK_IS_YOURS) dedicated to the lock requesting core is monitored for an indication that the lock requesting core has been granted the locked state 215 from a previous locking core of the processor cores 202. For example, in FIG. 7, cache line 314 of CPU 3 is monitored to determine when LOCK_IS_YOURS is set to YES by CPU 2 as the previous locking core (e.g., CPU-HOLD_LOCK=2 in FIG. 6).

At block 1220, the lock requesting core performs one or more updates to the lockable portion 208 of the shared memory resource 204 based on determining that the lock requesting core has been granted the locked state 215. Block 1220 can also be reached after marking the lock requesting core as owning the lock of the lockable portion 208 of the shared memory resource 204 in block 1225, where the lock was already available and waiting was unnecessary upon the initial check in block 1205.

The lock requesting core can check the lock waiting list (CPU_WAIT_LIST) for a subsequent lock requesting core based on the lock requesting core completing the one or more updates to the lockable portion 208 of the shared memory resource 204. The shared location 301 of the shared memory resource 204 can be marked to indicate that the shared memory resource 204 is in an unlocked state based on determining that the lock waiting list is empty (e.g., CPU_WAIT_LIST=0) upon completing the one or more updates to the lockable portion 208 of the shared memory resource 204. A lock granted location (LOCK_IS_YOURS) dedicated to the subsequent lock requesting core can be updated with an indication that the subsequent lock requesting core has been granted the locked state 215 based on the lock requesting core completing the one or more updates to the lockable portion 208 of the shared memory resource 204. The shared location 301 can be updated to indicate that the subsequent lock requesting core holds the lockable portion 208 of the shared memory resource 204 in the locked state 215.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A system comprising:
   a memory system comprising a shared memory resource; and
   a processor operably coupled to the memory system, the processor comprising a plurality of processor cores configured to perform a plurality of operations comprising:
     accessing a shared location of the shared memory resource to determine, by a lock requesting core of the processor cores, whether a lockable portion of the shared memory resource is in a locked state;
     adding a memory lock request, by the lock requesting core, to a lock waiting list associated with the lockable portion of the shared memory resource based on the shared location indicating the locked state;
     monitoring a lock granted location dedicated to the lock requesting core for an indication that the lock requesting core has been granted the locked state from a previous locking core of the processor cores; and
     performing one or more updates to the lockable portion of the shared memory resource by the lock requesting core based on determining that the lock requesting core has been granted the locked state,
   wherein the shared location comprises:
     a first cache line with shared read and write access between the processor cores, the first cache line comprising a lock word, an indicator of the processor core holding the locked state, and the lock waiting list;
     a second cache line used by one or more reading cores of the processor cores to indicate whether the lockable portion of the shared memory resource is in the locked state; and
     a separate cache line dedicated to each of the processor cores writeable by the processor cores to indicate that an individual one of the processor cores has been granted the locked state.

2. The system of claim 1, wherein the processor is further configured to perform the operations comprising:
   checking the lock waiting list by the lock requesting core for a subsequent lock requesting core based on the lock requesting core completing the one or more updates to the lockable portion of the shared memory resource.

3. The system of claim 2, wherein the processor is further configured to perform the operations comprising:
   marking the shared location of the shared memory resource to indicate that the shared memory resource is in an unlocked state based on determining that the lock waiting list is empty upon completing the one or more updates to the lockable portion of the shared memory resource.

4. The system of claim 2, wherein the processor is further configured to perform the operations comprising:
   updating a lock granted location dedicated to the subsequent lock requesting core with an indication that the subsequent lock requesting core has been granted the locked state based on the lock requesting core completing the one or more updates to the lockable portion of the shared memory resource; and
   updating the shared location to indicate that the subsequent lock requesting core holds the lockable portion of the shared memory resource in the locked state.

5. The system of claim 1, wherein the shared memory resource comprises a shared memory table.

6. A method of memory lock serialization, the method comprising:
   accessing a shared location of a shared memory resource to determine, by a lock requesting core of a plurality of processor cores of a processor, whether a lockable portion of the shared memory resource is in a locked state;
   adding a memory lock request, by the lock requesting core, to a lock waiting list associated with the lockable portion of the shared memory resource based on the shared location indicating the locked state;
   monitoring a lock granted location dedicated to the lock requesting core for an indication that the lock requesting core has been granted the locked state from a previous locking core of the processor cores; and
   performing one or more updates to the lockable portion of the shared memory resource by the lock requesting core based on determining that the lock requesting core has been granted the locked state,
   wherein the shared location comprises:
     a first cache line with shared read and write access between the processor cores, the first cache line comprising a lock word, an indicator of the processor core holding the locked state, and the lock waiting list;

a second cache line used by one or more reading cores of the processor cores to indicate whether the lockable portion of the shared memory resource is in the locked state; and a separate cache line dedicated to each of the processor cores writeable by the processor cores to indicate that an individual one of the processor cores has been granted the locked state.

7. The method of claim 6, further comprising:

checking the lock waiting list by the lock requesting core for a subsequent lock requesting core based on the lock requesting core completing the one or more updates to the lockable portion of the shared memory resource.

8. The method of claim 7, further comprising:

marking the shared location of the shared memory resource to indicate that the shared memory resource is in an unlocked state based on determining that the lock waiting list is empty upon completing the one or more updates to the lockable portion of the shared memory resource.

9. The method of claim 7, further comprising:

updating a lock granted location dedicated to the subsequent lock requesting core with an indication that the subsequent lock requesting core has been granted the locked state based on the lock requesting core completing the one or more updates to the lockable portion of the shared memory resource; and updating the shared location to indicate that the subsequent lock requesting core holds the lockable portion of the shared memory resource in the locked state.

10. A computer program product comprising a computer readable storage medium having program instructions embodied therewith, the program instructions executable by a processing system to perform a plurality of operations comprising:

accessing a shared location of a shared memory resource to determine, by a lock requesting core of a plurality of processor cores of a processor, whether a lockable portion of the shared memory resource is in a locked state;

adding a memory lock request, by the lock requesting core, to a lock waiting list associated with the lockable portion of the shared memory resource based on the shared location indicating the locked state;

monitoring a lock granted location dedicated to the lock requesting core for an indication that the lock requesting core has been granted the locked state from a previous locking core of the processor cores; and performing one or more updates to the lockable portion of the shared memory resource by the lock requesting core based on determining that the lock requesting core has been granted the locked state, wherein the shared location comprises:

a first cache line with shared read and write access between the processor cores, the first cache line comprising a lock word, an indicator of the processor core holding the locked state, and the lock waiting list;

a second cache line used by one or more reading cores of the processor cores to indicate whether the lockable portion of the shared memory resource is in the locked state; and a separate cache line dedicated to each of the processor cores writeable by the processor cores to indicate that an individual one of the processor cores has been granted the locked state.

11. The computer program product of claim 10, wherein the program instructions executable by the processing system are further configured to perform the operations comprising:

checking the lock waiting list by the lock requesting core for a subsequent lock requesting core based on the lock requesting core completing the one or more updates to the lockable portion of the shared memory resource.

12. The computer program product of claim 11, wherein the program instructions executable by the processing system are further configured to perform the operations comprising:

marking the shared location of the shared memory resource to indicate that the shared memory resource is in an unlocked state based on determining that the lock waiting list is empty upon completing the one or more updates to the lockable portion of the shared memory resource.

13. The computer program product of claim 11, wherein the program instructions executable by the processing system are further configured to perform the operations comprising:

updating a lock granted location dedicated to the subsequent lock requesting core with an indication that the subsequent lock requesting core has been granted the locked state based on the lock requesting core completing the one or more updates to the lockable portion of the shared memory resource; and updating the shared location to indicate that the subsequent lock requesting core holds the lockable portion of the shared memory resource in the locked state.

* * * * *